US011414500B2

(12) United States Patent
Leskinen et al.

(10) Patent No.: US 11,414,500 B2
(45) Date of Patent: Aug. 16, 2022

(54) PROCESS FOR PREPARING POLYPROPYLENE COMPOSITION

(71) Applicant: BOREALIS AG, Vienna (AT)

(72) Inventors: Pauli Leskinen, Helsinki (FI); Luca Boragno, Pichling (AT)

(73) Assignee: BOREALIS AG, Vienna (AT)

( * ) Notice: Subject to any disclaimer, the term of this patent is extended or adjusted under 35 U.S.C. 154(b) by 315 days.

(21) Appl. No.: 16/473,471

(22) PCT Filed: Dec. 27, 2017

(86) PCT No.: PCT/EP2017/084643
§ 371 (c)(1),
(2) Date: Jun. 25, 2019

(87) PCT Pub. No.: WO2018/122263
PCT Pub. Date: Jul. 5, 2018

(65) Prior Publication Data
US 2019/0367642 A1 Dec. 5, 2019

(30) Foreign Application Priority Data
Dec. 29, 2016 (EP) ..................................... 16207305

(51) Int. Cl.
C08F 2/00 (2006.01)
C08F 2/34 (2006.01)
C08F 4/649 (2006.01)
C08F 210/06 (2006.01)
C08F 210/08 (2006.01)
C08J 5/18 (2006.01)
B32B 27/32 (2006.01)
C08F 4/02 (2006.01)
C08F 4/651 (2006.01)
C08F 4/654 (2006.01)
C08F 4/70 (2006.01)
C08F 210/16 (2006.01)

(52) U.S. Cl.
CPC ............. *C08F 2/001* (2013.01); *B32B 27/32* (2013.01); *C08F 2/34* (2013.01); *C08F 4/022* (2013.01); *C08F 4/6492* (2013.01); *C08F 4/651* (2013.01); *C08F 4/6546* (2013.01); *C08F 4/7095* (2013.01); *C08F 210/06* (2013.01); *C08F 210/08* (2013.01); *C08F 210/16* (2013.01); *C08J 5/18* (2013.01); *C08F 2500/12* (2013.01); *C08F 2500/26* (2013.01); *C08J 2323/14* (2013.01)

(58) Field of Classification Search
CPC .......... C08F 2/001; C08F 2/34; C08F 4/6492; C08F 210/06; C08F 210/08; C08F 2500/12; C08F 2500/26; C08J 2323/14; C08J 2323/16
See application file for complete search history.

(56) References Cited

U.S. PATENT DOCUMENTS

2008/0188622 A1 8/2008 Nozawa

FOREIGN PATENT DOCUMENTS

| CN | 1061031 A | 5/1992 |
| CN | 101255256 A | 9/2008 |
| CN | 102712718 A | 10/2012 |
| CN | 103347951 A | 10/2013 |
| CN | 105899554 A | 8/2016 |
| EP | 0483523 A1 | 5/1992 |
| EP | 0887379 | 12/1998 |
| EP | 2610271 A1 | 7/2013 |
| EP | 2610272 A1 | 7/2013 |
| EP | 2778182 A1 | 9/2014 |
| EP | 3064548 A1 | 9/2016 |
| KR | 20160038784 A | 4/2016 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2009/019169 A1 | 12/2009 |
| WO | 2012/007430 A1 | 1/2012 |

OTHER PUBLICATIONS

Parkinson, et al., "Effect of Branch Length on 13C NMR Relaxation Properties in Molten Poly[ethylene-co-(a-olefin)] Model Systems", 2007, pp. 21828-22133.
Pollard, et al., "Observation of Chain Branching in Polyethylene in the Solid State and Melt via 13C NMR Spectroscopy and Melt NMR Relaxation Time Measurements", Macromolecules 2004, pp. 813-825.
Zhou, et al., "A new decoupling method for accurate quantification of polyethylene copolymer composition and triad sequence distribution with 13C NMR", Journal of Magnetic Resonance 187, (2007), pp. 225-233.
Resconi, et al., "Selectivity in Propene Polymerization with Metallocene Catalysts", Chem. Rev. 2000, pp. 1253-1345.
Klimke, et al., "Optimisation and Application of Polyolefin Branch Quantification by Melt-State 13C NMR Spectroscopy", Macromol. Chem. Phys. 2006, pp. 382-395.
Griffin, et al., "Low-load rotor-synchronised Hahn-echo pulse train (RS-HEPT) 1H decoupling in solid-state NMR: factors affecting MAS spin-echo dephasing times", Oct. 16, 2007, pp. S198-S208.
Filip, et al., "Heteronuclear decoupling under fast MAS by a rotor-synchronized Hahn-echo pulse train", Journal of Magnetic Resonance, (2005), pp. 239-243.

(Continued)

*Primary Examiner* — Catherine S Branch
(74) *Attorney, Agent, or Firm* — Tarolli, Sundheim, Covell & Tummino LLP

(57) ABSTRACT

The invention relates to a process for producing a polypropylene composition by sequential polymerization said polypropylene composition having low sealing initiation temperature (SIT) and high melting point (Tm), presenting thus a broad sealing window.

10 Claims, No Drawings

(56) References Cited

OTHER PUBLICATIONS

Castignolles, et al. "Detection and quantification of branching in polyacrylates by size-exclusion chromatography (SEC) and melt-state 13C NMR spectroscopy", (2009), pp. 2373-2383.
Busico, et al., "Microstructure of polypropylene", Prog. Polym. Sci. 26, (2001), pp. 443-533.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.
Busico, et al., "Full Assignment of the 13C NMR Spectra of Regioregular Polypropylenes: Methyl and Methylene Region", Macromolecules 1997, pp. 6251-6263.
Klimke, et al., "Observation of Chain Branching in Polyethylene in the Solid State and Melt via 13C NMR Spectroscopy and Melt NMR Relaxation Time Measurements", Macromolecules 2004, 37, 813-825.
Korean Office Action for Application No. 10-2019-7017153 dated Jun. 29, 2020.
Applicant: Borealis AG; Chinese Office Action for Application No. 201780080552.X dated May 8, 2021.

PROCESS FOR PREPARING POLYPROPYLENE COMPOSITION

The present invention relates to a sequential polymerization process for producing a polypropylene composition comprising two propylene polymer fractions. More specifically the invention relates to a process for producing a polypropylene composition comprising a propylene copolymer and a propylene terpolymer. Further, the invention is directed to a polypropylene composition obtainable by the process of the invention and the use of said polypropylene composition for producing articles.

Propylene homopolymers and copolymers are suitable for many applications such as packaging, textile, automotive and pipe. An important area of application of propylene polymers is the packaging industry. Particularly in film application where sealing properties play an important role, e.g., heat sealing.

Heat sealing is the predominant method of manufacturing flexible and semi-rigid packages. Important characteristics of good sealing performance are:

a) low seal initiation temperature (SIT), which is needed to support high speed on packaging machines, b) broad sealing window, which is especially needed for processing window on HFFS (Horizontal Form, Fill and Seal) packaging lines
and c) additionally high melting point, which is important, for example in biaxially oriented PP (BOPP), to avoid stickiness and blocking and to accomplish high BOPP line speeds.

To ensure fast sealing, a low SIT is of advantage since by operating at lower temperature there is the benefit that the article to be sealed is not exposed to high temperatures. There are also economic advantages since lower temperatures are of course cheaper to generate and maintain.

There are further advantages by avoiding high sealing temperatures, especially when temperature sensitive goods are to be packed.

In the polyolefin film field, the properties of a specific type of film come generally from the polyolefin composition comprised in such film. A process allowing the production of said polyolefin composition is then of high relevance for getting the required polyolefin properties. Thus there is a general need of a polyolefin composition having low seal initiation temperature (SIT) and high melting point. As well as there is also a need of a process for producing said polyolefin composition having the required low seal initiation temperature (SIT) and high melting point properties.

WO2009019169 discloses a process for producing propylene terpolymer comprising as comonomers ethylene and a $C_4$-$C_8$ alpha-olefin. The process is carried out in gas-phase reactor comprising two interconnected polymerization zones in the presence of a Ziegler-Natta catalyst. The polymerization process of WO2009019169 relates to the production of propylene terpolymer by directly polymerizing propylene with the above mentioned comonomers, thus forming the propylene terpolymer. The process in WO2009019169 does not lead to the production of a polypropylene composition being a binary blend comprising a propylene copolymer and a propylene terpolymer.

The present invention is based on the finding that the above discussed needs for heat sealing applications, i.e. simultaneously having improved balance between high melting point and low sealing initiation temperature (SIT), broad sealing window and thermal stability can be achieved by a process for producing a specific polyolefin composition.

Thus the present invention provides a process for producing a polypropylene composition by a sequential polymerization process wherein the polypropylene composition is a binary blend comprising two propylene polymer fractions PPF1 and PPF2 and wherein the process comprises at least two reactors connected in series, said process comprising the steps:

a) polymerizing in a first reactor (R-1) being a slurry reactor, preferably a loop reactor (L-R), propylene and one comonomer selected from $C_4$-$C_{10}$ alpha-olefin obtaining a propylene polymer fraction (PPF1), being a propylene copolymer, b) transferring the propylene polymer fraction (PPF1) and unreacted comonomers of the reactor (R-1) into a second reactor (R-2) being a first gas-phase reactor-1 (GPR-1), c) in the gas-phase reactor-1 (GPR-1) propylene, ethylene and one comonomer selected from $C_4$-$C_{10}$ alpha-olefin are polymerized in the presence of the propylene polymer fraction (PPF1), obtaining a propylene polymer fraction (PPF2), being a polypropylene terpolymer,
the propylene polymer fraction (PPF2) and the propylene polymer fraction (PPF1) forming the polypropylene composition, d) recovering the polypropylene composition which is characterized in that the mol ratio of $C_4$-$C_{10}$ alpha-olefin content in the propylene copolymer fraction PPF1 ($C_4$-$C_{10}$-PPF1)/$C_4$-$C_{10}$ alpha-olefin content in the polypropylene composition ($C_4$-$C_{10}$-T), [($C_4$-$C_{10}$-PPF1)/($C_4$-$C_{10}$-T)] is in the range of 0.10 to 0.95
and wherein the polypropylene composition has a melting temperature (Tm) in the range of 135 to 160° C. as determined by DSC according to ISO 11357.

According to the inventive process the $C_4$-$C_{10}$ alpha-olefin comonomer is incorporated into the polymer fractions PPF1 and PPF2 in different amounts resulting in a polypropylene composition having bimodal comonomer composition with respect to the $C_4$-$C_{10}$ alpha-olefin comonomer.

In the process according to the invention the $C_4$-$C_{10}$ alpha-olefin comonomer is preferably $C_4$-$C_8$ alpha-olefin comonomer, more preferably $C_4$-$C_8$ alpha-olefin comonomer, even more preferably 1-butene ($C_4$) comonomer thorough the present invention.

The polypropylene composition is produced in a sequential polymerization process. The term "sequential polymerization process" indicates that the polypropylene composition is produced in at least two reactors connected in series. In one preferred embodiment the term "sequential polymerization process" indicates, in the present application, that the polymer of the first reactor (R-1), i.e. the propylene polymer fraction (PPF1), is directly conveyed with unreacted monomers into a second reactor (R-2) in which the propylene polymer fraction (PPF2) is produced. Accordingly, a decisive aspect of the present process is the preparation of the polypropylene composition in at least two different reactors, wherein the reaction mixture of the first reactor (R-1) is conveyed, preferably directly conveyed; to the second reactor (R-2), and thus the polypropylene composition comprise two fractions, namely propylene polymer fraction (PPF1) and propylene polymer fraction (PPF2). Accordingly the present process comprises at least a first reactor (R-1) and a second reactor (R-2). The process may comprise at least one additional polymerization reactor subsequent to reactor (R-2). In one specific embodiment the instant process consists of two polymerization reactors (R-1) and (R-2). The term "polymerization reactor" shall indicate that the main polymerization takes place. Thus in case the process consists of two or more polymerization reactors, this definition does not exclude the option that the overall process comprises for instance a pre-polymerization step in a pre-polymerization reactor. The term "consists of" is only a closing formulation in view of the main polymerization reactors. In case of comprising a pre-polymerization reactor, propylene polymer fraction (PPF1) means the sum of (co)polymers produced in the pre-polymerization reactor and the first polymerization reactor (R-1).

The polymerization reactors are selected from slurry (SR) and gas phase (GPR) reactors.

The first reactor (R-1) is preferably a slurry reactor (SR) and can be any continuous or simple stirred batch tank reactor or loop reactor operating in bulk or slurry. By "bulk polymerization" it is meant a process where the polymerization is conducted in a liquid monomer essentially in the absence of an inert diluent. However, as it is known to a person skilled in the art, that the monomers used in commercial production are never pure but always contain aliphatic hydrocarbons as impurities. For instance, the propylene monomer may contain up to 5% of propane as an impurity. Thus, preferably bulk means a polymerization in a reaction medium that comprises of at least 60% (wt/wt) of the monomer. According to the present invention the slurry reactor (SR) is preferably a loop reactor (L-R).

The second reactor (R-2) is preferably a gas phase reactor (GPR). Such gas phase reactor (GPR) can be any mechanically mixed or fluidized bed reactor or settled bed reactor. Preferably the gas phase reactor (GPR) comprises a mechanically agitated fluidized bed reactor with gas velocities of at least 0.2 m/sec. The gas phase reactor of a fluidized bed type reactor can further include a mechanical agitator to facilitate the mixing within the fluidized bed. The potential additional reactor is preferably a gas phase reactor.

A preferred polymerization process is a "loop-gas phase"-process, such as developed by Borealis and known as BORSTAR™ technology. Examples of this polymerization process are described in EP0887379, WO92/12182, WO2004/000899, WO2004/111095, WO99/24478, WO99/24479 and WO00/68315.

The present process optionally encompasses a pre-reactor stage prior to the polymerization in the first reactor (R-1). The pre-reactor stage takes place in a pre-polymerization reactor (PRE-POL) wherein a pre-polymerization of propylene is conducted. The pre-polymerization reactor (PRE-POL) is of smaller size compared to the first (R-1) and second (R-2) reactor, respectively. The reaction volume of the pre-polymerization reactor (PRE-POL) can be e.g. between 0.001% and 10% of the reaction volume of the first reactor (R-1), like the loop reactor (L-R). In said pre-polymerization reactor (PRE-POL), pre-polymerization of propylene is performed in bulk or slurry as defined for the first reactor (R-1) above.

The operating temperature in the pre-polymerization reactor is in the range of 0 to 60° C., preferably in the range of 15 to 50° C., more preferably in the range of 20 to 30° C.

The pressure in the pre-polymerization reactor is not critical but must be sufficiently high to maintain the reaction mixture in liquid phase. Thus, the pressure in the pre-polymerization reactor may be in the range of 20 to 100 bar, preferably in the range of 30 to 70 bar. Hydrogen can be added in the pre-polymerization reactor in order to control the molecular weight, i.e., the melt flow rate $MFR_2$ of the (co)polymers produced in the pre-polymerization reactor (PRE-POL).

In the first reactor (R-1) a monomer feed comprised of propylene and one comonomer selected from $C_4$-$C_{10}$ alpha-olefin is fed. In case the optionally pre-reactor stage is present the (co)polymers produced in the pre-polymerization reactor (Pre-PP), is also fed in the first reactor (R-1).

In the first reactor (R-1) of the sequential polymerization process a propylene polymer fraction (PPF1), being a propylene copolymer, is produced.

The operating temperature in the first reactor (R-1) is generally in the range of 62 to 85° C., preferably in the range of 65 to 82° C., more preferably in the range of 67 to 80° C. Typically the pressure in the first reactor (R-1) is in the range of 20 to 80 bar, preferably in the range of 30 to 70 bar, more preferably in the range of 35 to 65 bar. Hydrogen can be added in the first reactor (R-1) in order to control the molecular weight, i.e., the melt flow rate $MFR_2$ of the propylene polymer fraction (PPF1) produced in said first reactor (R-1).

Generally the hydrogen/propylene ($H_2/C_3$) ratio in the first reactor (R-1) is in the range of 0.01 to 5.00 mol/kmol, preferably in the range of 0.15 to 4.00 mol/kmol, more preferably in the range of 0.25 to 3.00 mol/kmol.

Generally the $C_4$-$C_{10}$ alpha-olefin/$C_3$ ratio in the first reactor (R-1) is in the range of 3 to 300 mol/kmol, preferably in the range of 10 to 250 mol/kmol, more preferably in the range of 20 to 200 mol/kmol.

The propylene polymer fraction (PPF1) and the unreacted comonomers of the first reactor (R-1) are directly fed into the second reactor (R-2). By "direct feed" is meant a process wherein the content of the first reactor (R-1) is led directly to the next reactor stage, i.e., the second reactor (R-2). Propylene, ethylene and one comonomer selected from $C_4$-$C_{10}$ alpha-olefin are fed into the second reactor (R-2). In the second reactor (R-2) of the sequential polymerization process a propylene polymer fraction (PPF2), being a propylene terpolymer, is produced.

The operating temperature in the second reactor (R-2) is generally in the range of 70 to 95° C., preferably in the range of 75 to 90° C., more preferably in the range of 78 to 88° C.

Typically the pressure in the second reactor (R-2) is in the range of 5 to 50 bar, preferably in the range of 15 to 40 bar. Hydrogen can be added in the second reactor (R-2) in order to control the molecular weight, i.e., the melt flow rate $MFR_2$ of the propylene polymer fraction (PPF2) produced in said second reactor (R-2).

Generally the hydrogen/propylene ($H_2/C_3$) ratio in the second reactor (R-2) is in the range of 2.0 to 200.0 mol/kmol, preferably in the range of 10 to 150.0 mol/kmol, more preferably in the range of 12 to 100.0 mol/kmol.

Generally the $C_4$-$C_{10}$ alpha-olefin/$C_3$ ratio in the second reactor (R-2) is in the range of 30 to 300 mol/kmol, preferably in the range of 50 to 250 mol/kmol, more preferably in the range of 150 to 200 mol/kmol.

Generally the ethylene/propylene ($C_2/C_3$) ratio in the second reactor (R-2) is in the range of 2.0 to 65.0 mol/kmol, preferably in the range of 10.0 to 45.0 mol/kmol.

In the process according to the invention the propylene polymer fraction, propylene copolymer (PPF1) obtained in the first reactor (R-1) is generally produced in an amount of less than or equal to 50 wt %, preferably in an amount in the range of 30 to 50 wt %, more preferably in an amount in the range of 35 to 50 wt %.

In the process according to the invention the propylene polymer fraction, propylene terpolymer (PPF2) obtained in the second reactor (R-2) is generally produced in an amount of more than or equal to 50 wt %, preferably in an amount in the range of 50 to 70 wt %, more preferably in an amount in the range of 50 to 65 wt %. The amount of PPF1 and PPF2 being relative to the total sum of the propylene polymer fractions PPF1 and PPF2.

After the polymerization in the second reactor stage is finished, the polypropylene composition according to the invention is recovered by conventional procedures. The recovered polypropylene composition according to the invention is generally in the form of particles. The resulting polypropylene composition in form of particles may be pelletized in a conventional compounding extruder with various additives such as stabilizers, antioxidants, ultraviolet absorbers, antistatic agents and slipping agents. Typically the polypropylene composition according to the invention may contain not more than 5.0 wt %, yet more preferably not more than 3.0 wt %, like not more than 2.0 wt % of additives mentioned herein.

Generally a polymerization catalyst is present in the polymerization process according to the invention. The polymerization catalyst can be a metallocene catalyst or a Ziegler-Natta catalyst. Generally the polymerization Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

Preferably a specific type of Ziegler-Natta catalyst is present in the polymerization process according to the invention. In this specific type of Ziegler-Natta catalyst it is essential that the internal donor is a non-phthalic compound. Preferably through the whole specific type of Ziegler-Natta catalyst preparation no phthalate compound is used thus the final specific type of Ziegler-Natta catalyst does not contain any phthalic compound. Thus the Ziegler-Natta catalyst is free of phthalic compound. Therefore the propylene polymer fractions PPF1 and PPF2 are free of phthalic compound.

Generally the specific type of Ziegler-Natta catalyst comprises an internal donor (ID) which is chosen to be a non-phthalic compound, in this way the specific type of Ziegler-Natta catalyst is fully free of undesired phthalic compound. Further the specific type of Ziegler-Natta catalyst can be a solid catalyst being preferable free of any external support material, like silica or $MgCl_2$, and thus the solid catalyst is self-supported.

The solid catalyst is obtainable by the following general procedure:

a) providing a solution of
- $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or
- $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
- $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
- $a_4$) Group 2 metal alkoxy compound of formula $M(OR_1)_n(OR_2)_mX_{2-n-m}$ or mixture of Group 2 alkoxides $M(OR_1)_nX_{2-n'}$ and $M(OR_2)_mX_{2-m'}$, where M is a Group 2 metal, X is halogen, $R_1$ and $R_2$ are different alkyl groups of 2 to 16 carbon atoms, and $0 \le n < 2$, $0 \le m < 2$ and $n+m+(2-n-m)=2$, provided that n and m are not 0 simultaneously, $0 < n' \le 2$ and $0 < m' \le 2$; and b) adding said solution from step a) to at least one compound of a transition metal of Group 4 to 6 and c) obtaining the solid catalyst component particles, and adding a non-phthalic internal electron donor (ID) at least in one step prior to step c).

The internal donor (ID) or precursor thereof is added preferably to the solution of step a) or to the transition metal compound before adding the solution of step a).

According to the procedure above the solid catalyst can be obtained via a precipitation method or via an emulsion—solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of $a_2$) or $a_3$) is used, i.e. a solution of (Ax') or a solution of a mixture of (Ax) and (Bx).

Preferably the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that the magnesium compound reacts in addition to the alcohol (A) and alcohol (B) with a polyhydric alcohol (C) of formula R"(OH)$_m$ to obtain said magnesium alkoxide compound. Preferred polyhydric alcohols, if used, are alcohols, wherein R" is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like TiCl$_4$.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives of any of them and/or mixtures of any of them. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion—solidification method may be washed at least once, preferably at least twice, most preferably at least three times. The washing can take place with an aromatic and/or aliphatic hydrocarbon, preferably with toluene, heptane or pentane. Washing is also possible with TiCl$_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 μm, preferably 10 to 100 μm. The particles generally are compact with low porosity and generally have a surface area below 20 g/m$^2$, more preferably below 10 g/m$^2$. Typically the amount of Ti present in the catalyst is in the range of 1 to 6 wt %, the amount of Mg is in the range of 10 to 20 wt % and the amount of internal donor present in the catalyst is in the range of 10 to 40 wt % of the catalyst composition. A detailed description of the preparation of the catalysts used in the present invention is disclosed in WO2012/007430, EP2610271 and EP2610272 which are incorporated here by reference.

An external donor (ED) is preferably present as a further component in the polymerization process according to the invention. Suitable external donors (ED) include certain silanes, ethers, esters, amines, ketones, heterocyclic compounds and blends of these. It is especially preferred to use a silane. It is most preferred to use silanes of the general formula (I)

$$R^a_p R^b_q Si(OR^c)_{(4-p-q)} \qquad (I)$$

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (I) are (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si(OCH$_3$)$_2$. Another most preferred silane is according to the general formula (II)

$$Si(OCH_2CH_3)_3(NR^3R^4) \qquad (II)$$

wherein R$^3$ and R$^4$ can be the same or different and represent a linear, branched or cyclic hydrocarbon group having 1 to 12 carbon atoms. It is in particular preferred that R$^3$ and R$^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst (Co) can be present in the polymerization process according to the invention. The co-catalyst is preferably a compound of group 13 of the periodic table (IUPAC, version 2013), such as for example an aluminum compound e.g. an organo aluminum or aluminum halide compound. An example of a suitable organo aluminium compound is an aluminum alkyl or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally the molar ratio between the co-catalyst (Co) and the external donor (ED) [Co/ED] and/or the molar ratio between the co-catalyst (Co) and the transition metal (TM) [Co/TM] is carefully chosen for each process. The molar ratio between the co-catalyst (Co) and the external donor (ED), [Co/ED] can suitably be in the range of 2.5 to 50.0 mol/mol, preferably in the range of 4.0 to 35.0 mol/mol, more preferably in the range of 5.0 to 30.0 mol/mol. A suitable lower limit can be 2.5 mol/mol, preferably 4.0 mol/mol, more preferably 5.0 mol/mol. A suitable upper limit can be 50.0 mol/mol, preferably 35.0 mol/mol, more preferably 30.0 mol/mol. The lower and upper indicated values of the ranges are included.

The molar ratio between the co-catalyst (Co) and the transition metal (TM) [Co/TM] can suitably be in the range of 20.0 to 500.0 mol/mol, preferably in the range of 50.0 to 400.0 mol/mol, more preferably in the range of 100.0 to 300.0 mol/mol. A suitable lower limit can be 20.0 mol/mol, preferably 50.0 mol/mol, more preferably 100.0 mol/mol. A suitable upper limit can be 500.0 mol/mol, preferably 400.0 mol/mol, more preferably 300.0 mol/mol. The lower and upper indicated values of the ranges are included.

The invention also relates to a process according to the invention wherein the process is carried out in the absence of an anti-fouling agent. Examples of anti-fouling agent are Grinsted™ PS432 (Polyglycerol ester/Acetic Ester Blend) and Statsafe™ 3000 (surfactant in a liquid hydrocarbon solvent system). The process according to the present invention has the advantage that when is free of anti-fouling agent a higher productivity of the catalyst present in the process is achieved. This is possible due to the fact that the anti-fouling agent may be a poison for the catalyst.

The invention also relates to a polypropylene composition produced by the process according to the invention.

The polypropylene composition produced by the process according to the invention is a binary blend comprising, preferably consisting of, propylene polymer fraction PPF1 and propylene polymer fraction PPF2. Especially good results are achieved in case the individual propylene polymer fractions PPF1 and PPF2 are present in specific amounts.

The polypropylene composition produced by the process according to the invention generally has a higher content of C$_4$-C$_{10}$ alpha-olefin comonomer in the propylene polymer fraction PPF2 than in the propylene polymer fraction PPF1. Therefore the process according to the invention allows having a better and faster control of the polymerization process because the main process control actions are carried out only in the second reactor (R-2). Additionally the total residence time of the process is reduced.

The propylene polymer fraction (PPF1) comprised in the polypropylene composition produced by the process according to the invention does not have ethylene comonomer units. This means that no ethylene is fed into the first reactor (R-1) during the process according to the invention. The advantage of said process is that better properties of the polypropylene composition, produced by the process according to the invention, are obtained, i.e., polypropylene composition having low seal initiation temperature (SIT) and high melting temperature (Tm) values is obtained.

The propylene polymer fraction PPF1 is present in the polypropylene composition according to the invention in an amount of less than or equal to 50 wt %, preferably in an amount in the range of 30 to 50 wt %, more preferably in an amount in the range of 35 to 50 wt %. The amount of PPF1 being relative to the sum of the propylene polymer fractions PPF1 and PPF2.

The propylene polymer fraction PPF2 is present in the polypropylene composition according to the invention in an amount of more than or equal to 50 wt %, preferably in an amount in the range of 50 to 70 wt %, more preferably in an amount in the range of 50 to 65 wt %. The amount of PPF2 being relative to the sum of the propylene polymer fractions PPF1 and PPF2.

The propylene polymer fraction PPF1 is generally a propylene copolymer comprising one comonomer selected from C$_4$-C$_{10}$ alpha-olefin comonomer preferably one comonomer selected from C$_4$-C$_8$ alpha olefin comonomer, more preferably one comonomer selected from C$_4$-C$_8$ alpha olefin comonomer, even more preferably 1-butene (C$_4$).

The propylene copolymer (PPF1) generally has C$_4$-C$_{10}$ alpha-olefin comonomer units (C$_4$-C$_{10}$-PPF1) in an amount of 1.50 to 7.00 mol %, preferably in an amount of 2.30 to 6.10 mol %, more preferably in an amount of 3.00 to 5.40 mol %. The amount of C$_4$-C$_{10}$ alpha-olefin comonomer units is relative to the total amount of monomers in the propylene copolymer (PPF1).

Generally the melt flow rate (MFR$_2$) for the propylene copolymer (PPF1) is of ≤10.0 g/10 min. The MFR$_2$ for propylene copolymer (PPF1) is determined according to ISO 1133, at a temperature of 230° C. and under a load of 2.16 kg. It is preferred that the MFR$_2$ for the propylene copolymer (PPF1) is between 3.0 and 10.0 g/10 min, more preferably the MFR$_2$ is between 4.0 and 9.0 g/10 min. A suitable lower limit is 3.0 g/10 min, preferably 4.0 g/10 min. A suitable upper limit is 10.0 g/10 min, preferably 9.0 g/10 min. The lower and upper indicated values of the ranges are included.

The propylene polymer fraction PPF2 is generally a propylene terpolymer comprising ethylene comonomer and one comonomer selected from C$_4$-C$_{10}$ alpha-olefin, preferably ethylene comonomer and one comonomer selected from C$_4$-C$_8$ alpha olefin comonomer, more preferably ethylene comonomer and one comonomer selected from C$_4$-C$_8$ alpha olefin comonomer, even more preferably ethylene comonomer and 1-butene (C$_4$).

The propylene terpolymer (PPF2) generally has ethylene comonomer units in an amount of 0.30 to 12.00 mol %, preferably in an amount of 0.45 to 9.00 mol %, more preferably in an amount of 0.60 to 7.50 mol %. The amount of ethylene comonomer units is relative to the total amount of monomers in the propylene terpolymer (PPF2). The above mentioned ranges of ethylene content in the propylene terpolymer (PPF2) allow having a higher productivity in the second reactor (R-2) of the process according to the invention, which also contributes to fine tuning the properties of the polypropylene composition comprising said propylene terpolymer (PPF2).

The propylene terpolymer (PPF2) generally has $C_4$-$C_{10}$ alpha-olefin comonomer units in an amount of 1.50 to 17.00 mol %, preferably in an amount of 3.50 to 16.00 mol %, more preferably in an amount of 5.00 to 15.00 mol %. The amount of $C_4$-$C_{10}$ alpha-olefin comonomer units is relative to the total amount of monomers in the propylene terpolymer (PPF2).

Generally the melt flow rate ($MFR_2$) for the propylene terpolymer (PPF2) is of ≤10.0 g/10 min. The $MFR_2$ for propylene terpolymer (PPF2) is calculated according to the method described in the measuring methods section of this document. It is preferred that the $MFR_2$ for the propylene terpolymer (PPF2) is between 3.0 and 10.0 g/10 min, more preferably the $MFR_2$ is between 4.0 and 9.0 g/10 min. A suitable lower limit is 3.0 g/10 min, preferably 4.0 g/10 min. A suitable upper limit is 10.0 g/10 min, preferably 9.0 g/10 min. The lower and upper indicated values of the ranges are included.

The polypropylene composition generally has a total amount of ethylene comonomer units in the range of 0.2 to 6.00 mol %, preferably in the range of 0.3 to 4.50 mol %, more preferably in the range of 0.45 to 3.70 mol %. The amount of ethylene comonomer units is relative to the total amount of monomers in the polypropylene composition.

The polypropylene composition generally has a total amount of $C_4$-$C_{10}$ alpha-olefin comonomer units ($C_4$-$C_{10}$-T) in the range of 3.8 to 12.00 mol %, preferably in the range of 4.6 to 11.00 mol %, more preferably in the range of 5.3 to 10.50 mol %. The amount of $C_4$-$C_{10}$ alpha-olefin comonomer units is relative to the total amount of monomers in the polypropylene composition.

Generally the mol ratio of $C_4$-$C_{10}$ alpha-olefin content in the propylene copolymer fraction PPF1 ($C_4$-$C_{10}$-PPF1)/$C_4$-$C_{10}$ alpha-olefin content in the polypropylene composition ($C_4$-$C_{10}$-T) [($C_4$-$C_{10}$-PPF1)/($C_4$-$C_{10}$-T)] is in the range of 0.10 to 0.95, preferably in the range of 0.30 to 0.50.

Generally the melt flow rate ($MFR_2$) for the polypropylene composition according to the invention is in the range of 1.0 to 50.0 g/10 min. The $MFR_2$ for the polypropylene composition is determined according to ISO 1133, at a temperature of 230° C. and under a load of 2.16 kg. It is preferred that the $MFR_2$ for the polypropylene composition is between 3.0 to 20.0 g/10 min, more preferably the $MFR_2$ is between 4.0 to 10.0 g/10 min, even more preferably the $MFR_2$ is between 5.0 to 8.0 g/10 min. A suitable lower limit is 1.0 g/10 min, preferably 3.0 g/10 min, more preferably 4.0 g/10 min, even more preferably 5.0 g/10 min. A suitable upper limit is 50.0 g/10 min, preferably 20.0 g/10 min, more preferably 10.0 g/10 min, even more preferably 8.0 g/10 min. The lower and upper indicated values of the ranges are included.

Generally the polypropylene composition according to the invention has a sealing initiation temperature (SIT) in the range of 85 to 120° C., preferably in the range of 90 to 115° C., more preferably in the range of 95 to 110° C. The sealing initiation temperature (SIT) calculated on pellets via DSC measurement, according to the method described in the measuring methods section of this document.

Generally the polypropylene composition according to the invention has a melting temperature (Tm) in the range of 135 to 160° C., preferably in the range of 137 to 155 C, more preferably in the range of 140 to 150 C. The melting temperature (Tm) is determined by DSC according to ISO 11357.

Generally the polypropylene composition according to the invention has a xylene soluble fraction (XS) in the range of 3 to 40 wt %, preferably in the range of 4 to 35 wt %, more preferably in the range of 5 to 30 wt %. The xylene soluble fraction is determined at 25° C. according to ISO 16152; 5$^{th}$ edition; 2005-07-01.

Generally the polypropylene composition according to the present invention satisfies the equation (1) below:

$$\text{Delta} = Tm - SIT \quad\quad\quad \text{equation (1).}$$

wherein Delta is in the range of 30 to 50° C., and wherein
Tm is the melting temperature, in ° C., of the polypropylene composition according to the invention,
SIT is the sealing initiation temperature (SIT) calculated on pellets via DSC measurement, according to the method described in the measuring methods section of this document.

Preferably the Delta value according to equation (1) is in the range of 32 to 48° C., more preferably in the range of 34 to 46° C.

The present invention also provides a process for producing a polypropylene composition according to the present invention characterized in that the propylene polymer fraction PPF1 is a propylene copolymer comprising 1-butene ($C_4$) and the propylene polymer fraction PPF2 is a propylene terpolymer comprising ethylene comonomer and 1-butene ($C_4$).

The present invention also provides a process for producing a polypropylene composition according to the present invention characterized in that the propylene polymer fraction PPF1 is a propylene copolymer consisting of propylene and 1-butene ($C_4$) and the propylene polymer fraction PPF2 is a propylene terpolymer consisting of propylene, ethylene and 1-butene ($C_4$).

The present invention also provides an article comprising the polypropylene composition produced by the process according to the invention. Suitable articles comprising the polypropylene composition produced by the process according to the invention are films, e.g., films for flexible packaging systems, such as bags or pouches for food packaging in general.

Preferred articles are mono-layer or multilayer films which can be obtained by any process known to an art skilled person, like cast film technology or blown film technology. The films are preferably used in multilayer film structures as sealing layer, preferably as very thin sealing layer, on top of the multilayer structure.

Accordingly the present invention is also related to an article comprising at least 70.0 wt %, preferably comprising at least 80.0 wt %, more preferably comprising at least 90.0 wt %, still more preferably comprising at least 95.0 wt %, yet more preferably comprising at least 99.0 wt % of the polypropylene composition produced by the process according to the invention.

Finally the present invention relates to the use of the polypropylene composition produced by the process according to the invention for producing an article, a film or a multilayer film.

EXAMPLES

I. Measuring Methods

The following definitions of terms and determination methods apply for the above general description of the invention as well as to the below examples, unless otherwise defined.

a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

b) Melt Flow Rate ($MFR_2$) for the Propylene Terpolymer (PPF2)

The $MFR_2$ for the propylene terpolymer (PPF2) is calculated using the below formula: $\ln(MFR_2$ of the polypropylene composition$)=x$ $(\ln(MFR_2$ of the propylene copolymer (PPF1)$))+(1-x)(\ln(MFR_2$ of the propylene terpolymer (PPF2)$))$;
wherein $MFR_2$ of the polypropylene composition means the $MFR_2$ of the PP composition according to the present invention and wherein
x=the weight ratio (wt) of the propylene copolymer (PPF1) based on the combined weight of the propylene copolymer (PPF1) and the weight of the propylene terpolymer (PPF2) which is in total=1.

c) Melting Temperature

The melting temperature, Tm, is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The melting temperature (Tm) is being determined in the second heating step.

d) Xylene Cold Soluble Fraction (XS, Wt %)

The amount of the polymer soluble in xylene is determined at 25.0° C. according to ISO 16152; $5^{th}$ edition; 2005 Jul. 1.

e) Comonomer Content

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-butene were observed and the comonomer content quantified in the following way. The amount isolated 1-butene incorporated in PBP sequences was quantified using the integral of the $\alpha B2$ sites at 43.6 ppm accounting for the number of reporting sites per comonomer:

$B=I_{\alpha B2}/2$

The amount consecutively incorporated 1-butene in PBBP sequences was quantified using the integral of the $\alpha\alpha B2$ site at 40.5 ppm accounting for the number of reporting sites per comonomer:

$BB=2*I_{\alpha\alpha B2}$

The total 1-butene content was calculated based on the sum of isolated and consecutively incorporated 1-butene:

$B\text{total}=B+BB$

Characteristic signals corresponding to the incorporation of ethylene were observed and the comonomer content quantified in the following way. The amount isolated ethylene incorporated in PEP sequences was quantified using the integral of the S$\alpha\gamma$ sites at 37.9 ppm accounting for the number of reporting sites per comonomer:

$E=I_{S\alpha\gamma}/2$

When characteristic signals corresponding to consecutive ethylene incorporation in PEEP sequences were observed the amount of such consecutively incorporated ethylene was quantified using the integral of $S_{\beta\delta}$ sites at 27 ppm accounting for the number of reporting sites per comonomer:

$EE=I_{S\beta\delta}$

With no sites indicative of consecutive ethylene incorporation in PEEE sequences observed the total ethylene comonomer content was calculated as:

$E\text{total}=E+EE$

Characteristic signals corresponding to regio defects were not observed {resconi00}.

The amount of propene was quantified based on the main $S\alpha\alpha$ methylene sites at 46.7 ppm and compensating for the relative amount of methylene unit of propene in PBP, PBBP, PEP and PEEP sequences not accounted for:

$P\text{total}=I_{S\alpha\alpha}+B+BB/2+E+EE/2$

The total mole fraction of 1-butene in the polymer was then calculated as:

$fB=(B\text{total}/(E\text{total}+P\text{total}+B\text{total})$

The total mole fraction of ethylene in the polymer was then calculated as:

$fE=(E\text{total}/(E\text{total}+P\text{total}+B\text{total})$

The mole percent comonomer incorporation was calculated from the mole fractions:

$B[\text{mol \%}]=100*fB$ $E[\text{mol \%}]=100*fE$

The weight percent comonomer incorporation was calculated from the mole fractions:

$B[\text{wt \%}]=100*(fB*56.11)/((fE*28.05)+(fB*56.11)+((1-(fE+fB))*42.08))$ $E[\text{wt \%}]=100*(fE*28.05)/((fE*28.05)+(fB*56.11)+((1-(fE+fB))*42.08))$.

klimke06
Klimke, K., Parkinson, M., Piel, C., Kaminsky, W., Spiess, H. W., Wilhelm, M., Macromol. Chem. Phys. 2006; 207:382. parkinson07
Parkinson, M., Klimke, K., Spiess, H. W., Wilhelm, M., Macromol. Chem. Phys. 2007; 208:2128. pollard04

Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198 castignolles09
Castignolles, P., Graf, R., Parkinson, M., Wilhelm, M., Gaborieau, M., Polymer 50 (2009) 2373 busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251 zhou07
Zhou, Z., Kuemmerle, R., Qiu, X., Redwine, D., Cong, R., Taha, A., Baugh, D. Winniford, B., J. Mag. Reson. 187 (2007) 225 busico07
Busico, V., Carbonniere, P., Cipullo, R., Pellecchia, R., Severn, J., Talarico, G., Macromol. Rapid Commun. 2007, 28, 1128 resconi00
Resconi, L., Cavallo, L., Fait, A., Piemontesi, F., Chem. Rev. 2000, 100, 1253

The comonomer content of the propylene terpolymer (PPF2) is calculated using the below formula:

Comonomer content of the polypropylene composition=$x$(Comonomer content of the propylene copolymer (PPF1))+(1−$x$)(Comonomer content of the propylene terpolymer (PPF2)).

$x$=the weight ratio (wt) of the propylene copolymer (PPF1) based on the combined weight of the propylene copolymer (PPF1) and the weight of the propylene terpolymer (PPF2) which is in total=1.

f) Sealing Initiation Temperature (SIT), Sealing Range

Differential Scanning calorimetry (DSC) experiments were run on a TA Instruments Q2000 device calibrated with Indium, Zinc, and Tin according to ISO 11357/1. The measurements were run under nitrogen atmosphere (50 mL min-1) on 5±0.5 mg samples in a heat/cool/heat cycle with a scan rate of 10° C./min between −30° C. and 225° C. according to ISO 11357/3. Melting (Tm) and crystallisation (Tc) temperatures were taken as the peaks of the endotherms and exotherms in the cooling cycle and the second heating cycle respectively.

The Sealing Initiation Temperature (SIT) was predicted by analyzing the second heating scan according to the following procedure: the first limit for integration was set at 16° C., the second limit at Tm+20° C., and the total melting enthalpy was registered. The temperature T1 is defined as the temperature at which 19% of this melting enthalpy with the abovementioned limits for integration was obtained. The parameter SIT is finally calculated as:

SIT=1.0596×$T1$+3.8501

II. Inventive and Comparative Examples a) Catalyst Preparation 3.4 litre of 2-ethylhexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition the temperature was kept at 10.0° C. After addition the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by N2 sparging for 20 minutes to yield an air sensitive powder.

b) Inventive Examples (1E1 and 1E2)

The inventive examples (IE) were produced in a pilot plant with a prepolymerization reactor, one slurry loop reactor and one gas phase reactor. The solid catalyst component described above was used for the inventive examples 1E1 and 1E2 along with triethyl-aluminium (TEAL) as co-catalyst and dicyclo pentyl dimethoxy silane (D-donor) as external donor.

c) Comparative Examples (CE1, CE2 and CE3)

CE-1 is a $C_2C_4$ propylene terpolymer having a narrow molecular weight distribution, $MFR_2$ of 6.0 g/10 min and melting point of 130° C., seal initiation temperature (SIT) of 103° C. and is manufactured and distributed by *Borealis* under the Trade name TD315BF.

CE-2 is a $C_2C_4$ propylene terpolymer having a medium molecular weight distribution, $MFR_2$ of 6.0 g/10 min and melting point of 130° C., seal initiation temperature (SIT) of 103° C. and is manufactured and distributed by *Borealis* under the Trade name TD210BF.

CE-3 is a $C_2C_4$ propylene terpolymer having a medium molecular weight distribution, $MFR_2$ of 6 g/10 min and melting point of 130° C., seal initiation temperature (SIT) of 103° C. and is manufactured and distributed by *Borealis* under the Trade name TD215BF.

TABLE 1

Polymerization conditions.

|  |  | IE-1 | IE2 |
|---|---|---|---|
| Loop (propylene polymer fraction PPF1) | | | |
| Temperature | [° C.] | 70 | 70 |
| Pressure | [kPa] | 5340 | 5225 |
| Residence time | [h] | 0.47 | 0.50 |
| Split | [%] | 46 | 39 |
| $H_2/C_3$ ratio | [mol/kmol] | 0.91 | 0.60 |
| $C_4/C_3$ ratio | [mol/kmol] | 123 | 88 |
| $MFR_2$ | [g/10 min] | 5.6 | 4.9 |
| $C_4$ content | [mol %] | 4.0 | 3.8 |
| GPR 1 (propylene polymer fraction PPF2) | | | |
| Temperature | [° C.] | 80 | 75 |
| Pressure | [kPa] | 2500 | 2400 |
| Residence time | [h] | 1.82 | 2.3 |
| Split | [%] | 54 | 61 |
| $H_2/C_3$ ratio | [mol/kmol] | 10.1 | 14.9 |
| $C_2/C_3$ ratio | [mol/kmol] | 15.2 | 12 |
| $C_4/C_3$ ratio | [mol/kmol] | 203 | 143.9 |
| $MFR_2$ GPR 1 | [g/10 min] | 5.4 | 5.8 |
| $C_2$ content | [mol %] | 2.7 | 2.0 |
| $C_4$ content | [mol %] | 8.3 | 8.2 |
| Polypropylene composition | | | |
| $MFR_2$ | [g/10min] | 5.6 | 5.4 |
| XS | [wt %] | 10.1 | 14.8 |
| $C_4$ content total | [mol %] | 6.3 | 6.4 |
| $C_2$ content total | [mol %] | 1.5 | 1.2 |
| Melting point | [° C.] | 143.5 | 140.7 |
| $[(C_4\text{-}C_{10}\text{-PPF1})/(C_4\text{-}C_{10}\text{-T})]$ mol ratio | | 0.63 | 0.59 |

TABLE 2

Melting temperature (Tm), Seal initiation temperature (SIT) and Delta values of inventive examples (IE1, IE2) and comparative examples (CE1, CE2, CE3).

|  | IE1 | IE2 | CE1 | CE2 | CE3 |
|---|---|---|---|---|---|
| Tm | 143.5 | 140.7 | 129.8 | 132.8 | 131.3 |
| SIT [° C.] | 102.5 | 102.0 | 101.0 | 106.0 | 106.0 |
| Delta (Tm-SIT) | 41.0 | 38.7 | 29.0 | 27.0 | 25.0 |

From Table 2 it can be derived that the polypropylene compositions according to the invention present higher melting temperature (Tm) values and higher Delta (Tm–SIT) values than the comparative examples.

The invention claimed is:

1. Process for producing a polypropylene composition by a sequential polymerization process wherein the polypropylene composition is a binary blend comprising two propylene polymer fractions PPF1 and PPF2 and wherein the process comprises at least two reactors connected in series, said process comprising the steps:
   a) polymerizing in a first reactor (R-1), propylene and one comonomer selected from $C_4$-$C_{10}$ alpha-olefin to obtain a propylene polymer fraction (PPF1), the first reactor (R-1) being a slurry reactor and the propylene polymer fraction (PPF1) being a propylene copolymer,
   b) transferring the propylene polymer fraction (PPF1) and unreacted comonomers of the reactor (R-1) into a second reactor (R-2), the second reactor (R-2) being a first gas-phase reactor-1 (GPR-1),
   c) polymerizing in the gas-phase reactor-1 (GPR-1) propylene, ethylene and one comonomer selected from $C_4$-$C_{10}$ alpha-olefin in the presence of the propylene polymer fraction (PPF1), to obtain a propylene polymer fraction (PPF2), the propylene polymer fraction (PPF2) being a polypropylene terpolymer,
   d) forming the polypropylene composition from the propylene polymer fraction (PPF2) and the propylene polymer fraction (PPF1), and
   e) recovering the polypropylene composition wherein the mol ratio of $C_4$-$C_{10}$ alpha-olefin content in the propylene copolymer fraction PPF1 ($C_4$-$C_{10}$-PPF1)/$C_4$-$C_{10}$ alpha-olefin content in the polypropylene composition ($C_4$-$C_{10}$-T) $[(C_4\text{-}C_{10}\text{-PPF1})/(C_4\text{-}C_{10}\text{-T})]$ is in the range of 0.10 to 0.95,
   and wherein the polypropylene composition has a melting temperature (Tm) in the range of 135 to 160° C. as determined by DSC according to ISO 11357,
   wherein the polymerization process is carried out in the presence of a Ziegler-Natta catalyst that is free of phthalic compound, wherein the Ziegler-Natta catalyst comprises a transition metal of Group 4 to 6 (TM) and a non-phthalic internal donor (ID).

2. The process according to claim 1, wherein:
   a) the propylene copolymer fraction (PPF1) obtained in the first reactor (R-1) is produced in an amount of less than or equal to 50 wt %,
   b) the propylene terpolymer fraction (PPF2) obtained in the second reactor (R-2) is produced in an amount of more than or equal to 50 wt %,
   the amount of PPF1 and PPF2 being relative to the total sum of the propylene polymer fractions PPF1 and PPF2.

3. The process according to claim 1, wherein:
   a) the propylene polymer fraction PPF1 comprises 1.50 to 7.00 mol % of one comonomer selected from $C_4$-$C_{10}$ alpha-olefin, the amount of $C_4$-$C_{10}$ alpha-olefin comonomer relative to the total amount of monomers in the propylene copolymer (PPF1), and
   b) the propylene polymer fraction PPF2 comprises 0.30 to 12.00 mol % of ethylene comonomer and 1.50 to 17.00 mol % of one comonomer selected from $C_4$-$C_{10}$ alpha-olefin, the amount of ethylene and $C_4$-$C_{10}$ alpha-olefin comonomers relative to the total amount of monomers in the propylene terpolymer (PPF2).

4. The process according to claim 1, wherein the operating temperature in the first reactor (R-1) is in the range of 62 to 85° C.

5. The process according to claim 1, wherein the following components are present in said process:
   a co-catalyst (Co), and
   optionally an external donor (ED)
   and wherein if present, the co-catalyst (Co) to external donor (ED) molar ratio [Co/ED] is in the range of 2.5 to 50.0 mol/mol and wherein the co-catalyst (Co) to transition metal of Group 4 to 6 (TM) molar ratio [Co/TM] is in the range of 20.0 to 500.0 mol/mol.

6. The process according to claim 1, wherein the non-phthalic internal donor (ID) is selected from (di)esters of non-phthalic carboxylic (di)acids wherein the (di)ester is selected from the group consisting of malonates, maleates, succinates, citraconates, glutarates, cyclohexene-1,2-dicarboxylates, benzoates, derivatives of any of them, and mixtures of any of the preceding compounds.

7. The process according to claim 1, wherein the propylene polymer fraction PPF1 is a propylene copolymer comprising 1-butene ($C_4$) and the propylene polymer fraction PPF2 is a propylene terpolymer comprising ethylene comonomer and 1-butene ($C_4$).

8. The process according to claim 1, wherein the polypropylene composition satisfies the equation:

$$\text{Delta} = T_m - SIT$$

wherein Delta is in the range of 30 to 50° C., and wherein Tm is the melting temperature, in ° C., of the polypropylene composition, and
SIT is the sealing initiation temperature, in ° C., of the polypropylene composition.

9. The process according to claim 1, wherein the polypropylene composition has an $MFR_2$ in the range of 1.0 to 50.0 g/10 min, as measured at 230° C. under a load of 2.16 kg according to ISO 1133.

10. The process according to claim 1, wherein the process is carried out in the absence of an anti-fouling agent.

* * * * *